United States Patent [19]

Delpidio

[11] 4,400,029
[45] Aug. 23, 1983

[54] DEVICE FOR REMOVING WEEDS

[76] Inventor: Dominic J. Delpidio, 13 Hallmark Dr., Woburn, Mass. 01801

[21] Appl. No.: 308,377

[22] Filed: Oct. 5, 1981

[51] Int. Cl.³ .............................................. A01B 1/18
[52] U.S. Cl. ................................................. 294/50.9
[58] Field of Search .................... 294/50.9, 50.5, 50.6, 294/50.8, 104, 19 R; 30/124, 134

[56] References Cited

U.S. PATENT DOCUMENTS

| 694,088 | 2/1902 | Bowman | 294/50.9 |
| 2,470,899 | 5/1949 | Rink | 294/50.9 |
| 2,790,670 | 4/1957 | Sheets | 294/50.9 |

Primary Examiner—James B. Marbert
Attorney, Agent, or Firm—Wolf, Greenfield & Sacks

[57] ABSTRACT

A mechanical device for removing weeds or other plants comprising a clamp, tubular shaft handle, and a blade with a cutting edge shaped to be forced into the soil at an angle to engage the root immediately adjacent to the center of a weed. The blade and clamp are supported on an elongated tubular shaft which may be held in either hand on a curved section at the end opposite the blade and clamp. A leverage system controlled by the operator's thumb or hand actuates and holds the clamp open as the blade is positioned and inserted into the soil using hand or foot force movement of the blade to sever the weed root. The leverage system is released, causing the clamp to pin the weed between the clamp edge and blade. The operator then retracts the device at the same angle it was inserted with the weed firmly held between the blade and the clamp. The weed is released from the device by actuating the leverage system again to allow the weed to fall to any desired location or into a collector, without the operator having to bend or touch the weed. The only soil being removed or disturbed, if any, is a small amount immediately about the weed root.

12 Claims, 6 Drawing Figures

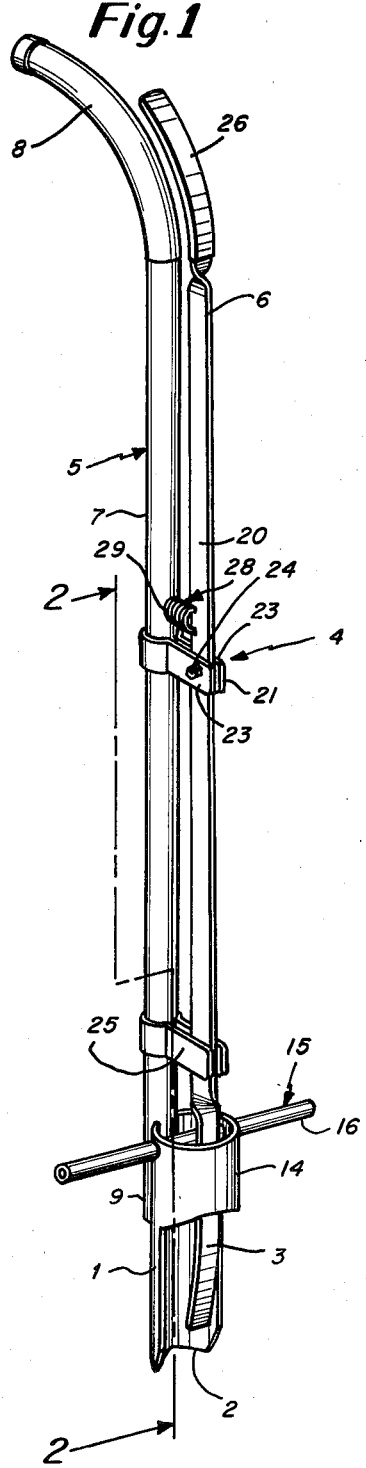
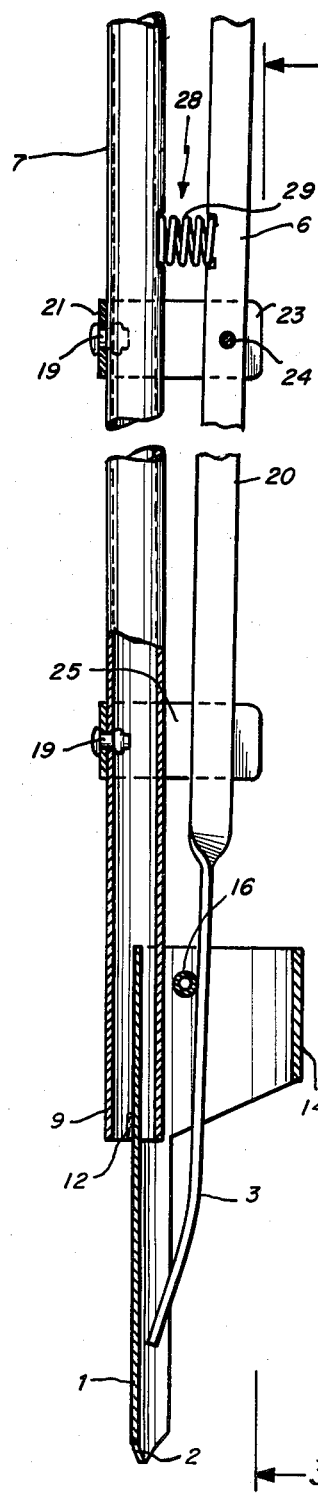
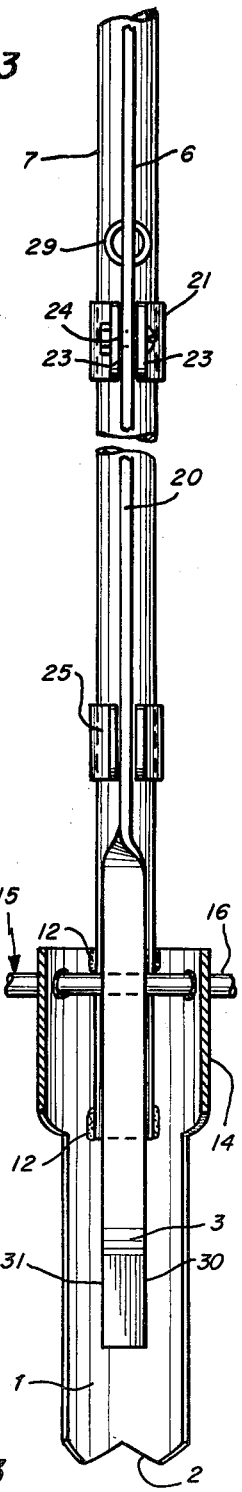

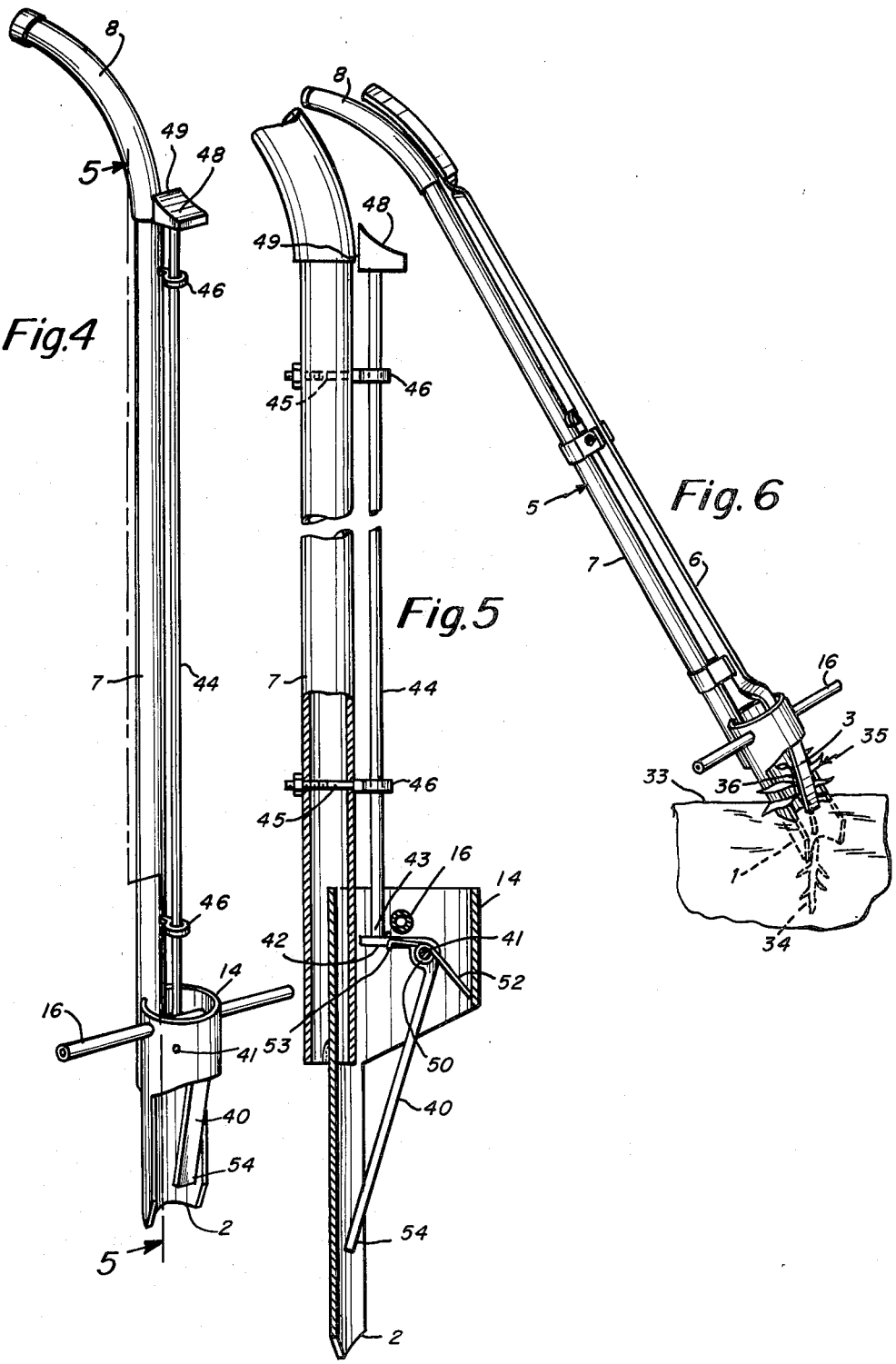

DEVICE FOR REMOVING WEEDS

SUBJECT MATTER OF INVENTION

The present invention relates to a lawn or gardening tool for removing weeds and in particular to a hand-actuated tool that can be used to remove weeds or other vegetation from a lawn or garden.

BACKGROUND OF INVENTION

Recent developments in gardening tools for removing weeds have included a tool which is intended to provide a simple and effective apparatus for removing weeds from the ground. This device is exemplified by U.S. Pat. No. 4,243,206 issued Jan. 6, 1981. The tool illustrated in this patent has an arrangement in which a plurality of tines or pins are forced into the soil by foot pressure. Once the pins are in the soil adjacent to the weed, the operator continues to step on the lever causing the pins to rotate in an upward direction and push the weed up from the soil. This arrangement has a number of undesirable characteristics which, in many instances, render the tool impractical for the purposes for which it has been intended. This prior art device requires foot pressure to be applied to the tool adjacent to the weed. This in turn means the operator must often stand on flowers or other vegetation to get at the weed to be removed. In addition, this prior art weed puller has a tendency to remove a large clump of sod with the weed. As a result, large divots are left in the soil with the removal of weeds. This creates an additional problem for lawns. In addition, small weeds slip easily between the tines or fingers that are supposed to engage them for removal. Moisture and soil conditions will also affect the operation of this tool. Finally, these prior art devices are complex, expensive, and still require the operator to bend over and pick up and dispose of the weed by hand and repair the potholes.

SUMMARY OF THE INVENTION

The present invention is designed to overcome many of the limitations inherent in the prior art devices used for weed removal. It is an object of the present invention to provide a tool for easily removing weeds without requiring the operator to bend over or touch the weed in any way. A further object of the present invention is to provide a lawn and gardening tool in which a particular weed may be deftly grasped by a clamping method and removed with substantially no sod being taken with it. A further object of the present invention is to provide a tool that permits the operator to reach into a garden bed or over obstacles for removal of a weed. A further object of the present invention is to provide an improved gardening tool of simple construction which is easy to maintain and which is inexpensive to manufacture. A still further object of the present invention is to provide a device for removing weeds which is fabricated of few moving components, providing a reliable and functional tool.

The present invention comprises a mechanical device having an elongated blade with a cutting edge at one end for pentrating the soil and cutting a weed below the soil surface. A clamp positioned adjacent to the blade and adapted for movement to and from a clamping position is commonly supported with the blade on an elongated member. The clamp is actuated by means also supported on an elongated member and operated from the remote end thereof. The weed is clamped and held until the clamp is released by the operator, freeing the weed for disposal without hand contact.

BRIEF DESCRIPTION OF DRAWINGS

The foregoing objects and advantages of the present invention will be more clearly understood when considered in connection with the accompanying drawings in which FIG. 1 is a perspective view of a preferred embodiment of the invention, FIG. 2 is an enlarged partially cross-sectioned elevational view of the lower half of the preferred embodiment illustrated in FIG. 1 and taken substantially along the Line 2—2 of FIG. 1;

FIG. 3 is a cross-sectional view taken substantially along the Line 3—3 of FIG. 2;

FIG. 4 is a perspective view of an alternate clamping embodiment of the present invention;

FIG. 5 is an enlarged fragmentary partially cross-sectioned view of the embodiment of FIG. 4 taken substantially along the Line 5—5 of FIG. 4; and FIG. 6 is a perspective view of the embodiment of FIG. 1 illustrating the method of using this invention.

DETAILED DESCRIPTION OF INVENTION

The preferred embodiment of this lawn and gardening tool is illustrated in FIGS. 1-3 inclusive. This tool is designed to remove weeds and other undesired vegetation from a garden without substantially disturbing the earth or other vegetation. In this invention an elongated blade (1) is formed with a cutting edge (2) at one end, with this blade (1) designed to penetrate the soil and cut a weed below the surface of the soil. A clamp (3) is positioned adjacent to the blade and is generally adapted for movement to and from a clamping position in which a weed is clamped between the clamp (3) and the blade (1). Means (4) is provided for moving the clamp to and from a clamping position. One end of an elongated member (5) supports the clamp (3) and blade (1). One end (6) of means (4) remote from the said one end of the elongated member (5) is provided with means for pivoting the clamp (3).

The elongated member (5) consists of a tubular metal support (7). One end (9) of the tubular metal support (7) has the blade (1) secured to it by suitable means. Preferably, these suitable means comprise shaping the end of the tubular metal support (7) in a cut-out section to receive the upper end of the blade (1). The contacting portions of the blade (19) and member (7) are tack welded at (12). The blade (1) has an arcuate cross-sectional configuration. This cross-sectional configuration is determined by cutting a 2.25" O.D. tube cross sectionally at an angle of 22.5° to its axis. The tube is then cut lengthwise along a chord of 1.5" O.D. The arc of the thus formed blade will be about 83°. This blade (1) may be of any convenient desired length as, for example, between five and seven inches long. The lower edge of the blade (1) is formed into the cutting edge (2) preferably serrated or generally tooth-shaped, as illustrated in FIG. (3). The upper end of the blade (1) may be integrally formed with a tubular member (14) to provide rigidity and strength to the structure and in particular to the blade (1). Means (15) for applying foot pressure are suitably secured to the upper end of the blade (1). These means (15) may comprise a shaft or rod (16) that is press fitted and extends through the tubular member (14) with projecting ends on either side of the tubular member (14). The ends on either side of the tubular member (14) are sufficient to permit the user to step on the rod (16) on either side of the tubular member (14) to force the cutting edge (2) into the earth if required. The rod (16) may be suitably secured by tack welding or a press fit.

The tubular member (7) forms a support for the blade (1) and clamp (3). This member (7) may be of any conventional and suitable length but preferably should be between approximately two and one half and four feet in length. The other end of the tubular member (7) from the end supporting blade (1) is conveniently bent into the handle (8).

Supported on the tubular member (7) are the means (4) for pivoting the clamp (3). This means consists of a lever (20) pivotally supported on a bracket (21). The bracket (21) consists preferably of a U-shaped member that extends about the tubular metal support (7) intermediate its ends with the bight of the bracket (21) secured by pop rivets (19) or otherwise suitably secured to the member (7). The bracket (21) is provided with a pair of legs (23) with the lever (20) extending between these legs (23) and with the lever (20) pivotally supported by pin (24) to the legs (23) of the bracket. A second bracket (25) also secured by pop rivets (19) to the member (7) in a fashion similar to bracket (21) is secured close to the clamps (3) and provides additional guiding means for the lower end of the lever (20).

The lever (20) is preferably formed of an elongated flat piece of metal twisted into three sections with the lower section forming the clamp (3). In this lower section, the plane of the flat metal is essentially parallel to the width of the blade (1). The center section of the flat metal forms the lever (2) with its length twisted 90° with respect to the blade (3). The upper section in end (6) forms a lever handle (26) with its surface parallel to the handle (8).

The tool is provided with means (28) for spring-loading the clamp into engaging position with the blade (1). This means (28) preferably comprises a helical spring (29) having one end engaging the tubular member (7) and the other engaging the lever (20) adjacent to the bracket (21). The spring forming the means of spring-loading (28) may be secured between the member (7) and lever (20) in any suitable fashion. Preferably, however, the lever (20) and the member (7) may be notched, as illustrated in FIG. 2, to receive the ends of the spring which will be secured in these notches by the spring-loading of this compression spring.

The relationship of the position of the spring means (28), the fulcrum provided by bracket (21), the length of the lever (20) and the length of the clamp (3) will all determine the force required to open the clamp (3) by squeezing the handle (26) against the handle (8) against the expansion force of spring (29). These relation will also determine the effective force applied to a weed by the clamping action of the clamp (3) against the blade (1). The width of the clamp (3) is approximately one-third of the width of the blade (1) as illustrated in FIG. 3. Further, the blade (1) is arcuate in shape while the clamp (3) is flat or straight. Because clamp (3) is flat, it engages the acruate blade (1) at line contacts along either edge (30, 31) of the clamp (3). This, in turn, means that there is a space between the center portion of the clamp (3) and the surface of the blade (1). This space minimizes the likelihood that the clamp will cut a weed when the weed is engaged between the clamp and blade (1). Rather, the clamp (3) will firmly grasp the root and leaf of the weed without severing it.

Referring to FIG. 6, there is illustrated a preferred method for using the tool of the present invention. In this use the tool is inserted into the ground, preferably at an angle of about 60° with the clamp (3) open and therefore away from the cutting edge (1). The cutting edge (1) penetrates the earth's surface (33) at the angle of about 60° cutting the root (34) of the weed (35) below the surface (33). As the tool continues to penetrate the earth the upper portion (36) of the weed (35) immediately above the cut is positioned between the clamp (3) and blade (1). The operator then releases the handle (26) which in turn causes the clamp (3) to move closer toward blade (1) engaging the upper portion (36) of the weed between the clamp (3) and blade (1). Because of the narrow relationship of the clamp (3) of the blade (1) very little or no soil is engaged by the tool. The tool may then be pulled from the earth removing only the upper portion (36) of the weed with a minimal amount of soil being disturbed. This arrangement permits the operator to reach most weeds in flower beds or the like without having to step on the bed or stand immediately over the weeds. When weeds are being removed from hard or rocky soil, the means (15) for applying pressure may be used. In this operation the operator simply places either foot on the rod or bar (16) to force the instrument into the ground.

Referring now to the embodiment illustrated in FIGS. 4 and 5, there is shown an alternate embodiment utilizing a different leverage system for actuating the clamping mechanism. In this embodiment, the tubular metal support (7), elongated blade (1), cutting edge (2), curved metal handle (8) and tubular member (14) are all similar in construction to the correspondingly numbered components of the preferred embodiments. The clamp (40) and the means for actuating it are, however, in this embodiment, different. In this embodiment the clamp (40) has a pivot-pin (41) welded or otherwise suitably secured to it at one end. The ends of this pivot-pin are journaled or supported for rotation in aligned holes formed in the tubular member (14). A lever (42) is secured to one end and extends at an acute angle from the clamp (40) toward the blade (1). This fixed lever is positioned to be engaged by end (43) of rod (44). Rod (44) is supported in spaced parallel relation to the tubular metal support (7). The rod (44) is supported by a plurality of brackets (45) which permit reciprocal movement of the rod in directions parallel to its length. The brackets (45) provide an eye guide for circular opening (46) through which the rod (44) passes. The other end of these brackets may be suitable anchored in or to the support (7). Thus, for example, the brackets (45) may be tack welded or bolted as illustrated to the rod (7). The end (48) of the rod remote from the clamp (40) is provided with a button (49) shaped to receive the operator's thumb, and is positioned at the end of handle (8) immediately adjacent the rod (7); the relation of handle (8) and button (49) is intended to permit an operator to grip the handle (8) and press the button (49) simultaneously with one hand.

A helical spring (50) is mounted axially on the pin (41) with one end (52) engaging inner surface of the tubular member (14) and the other end (53) engaging the fixed lever (42) so that the clamp (40) is normally spring loaded into clamping engagement at end (54) with the blade (1). To operate this embodiment, the operator forces the blade (1) into the soil about a weed at a preferred angle of about 60°, using foot pressure on the shaft or rod (16) if necessary. At the same time, the operator presses down on button (41) to move the end (54) of clamp (40) from the blade. Once the clamp and blade are suitably positioned about a weed, the operator removes the pressure from button (49) thereby allowing the spring (50) to move the clamp toward engagement with the blade, thereby grabbing or clamping a weed. On removal, the weed is released from the clamp allowing it to drop into a container or suitable receptacle.

When the tool is pulled from the soil, the upper portion of the weed is also removed. Since the weed has been severed below the surface of the soil and since substantially no soil is removed with the weed, the remaining weed root remains covered, allowing grass to fill the area previously occupied by the weed.

Having now described my invention, I claim:

1. A device for extracting weeds comprising:
   an elongated blade having a cutting edge at one end;
   an elongated support, said blade being affixed to one end of said support;
   a blade handle at the other end of said support, said elongated blade being longitudinally concave;
   reinforcing means for said blade;
   clamp means for engaging said elongated blade, said clamp means being substantially flat;
   an elongated lever parallel to said elongated support and extending from said clamp means to the upper end of said elongated support;
   a clamp handle at the upper end of said lever, the lower edge of said clamp handle adjacent the lower edge of said blade handle;
   means forming a pivot for said lever and supported by said support;
   a spring means normally tensioning said clamp toward said blade; and
   a foot bar extending from either side of the lower portion of said blade support, said foot bar being perpendicular to said blade support;
   wherein said clamp means, lever, and clamp handle are of a single-unit construction.

2. A device as in claim 1, wherein said clamp means engages said blade in the lower half of the surface of said blade.

3. A device as in claim 1, having means affixed to said support between said support and positioned between said pivot and said blade to guide said clamp lever.

4. A device as in claim 3, wherein said reinforcing means for said blade comprises a hollow cylindrical member extending from the upper portion of said blade, said blade being concave in a radius coincident wih the radius of said cylindrical portion.

5. A device as in claim 4, wherein said foot bar is supported by said cylindrical portion of said reinforcing means.

6. A device as in claim 1, wherein said support is tubular.

7. A device as in claim 1, wherein said clamp means, lever, and clamp handle are comprised of a twisted flat bar.

8. A device as in claim 7, wherein the horizontal plane of said lever is perpendicular to the horizontal plane of said clamp means and said clamp handle.

9. A device as in claim 1, wherein said spring means is positioned about two inches above said pivot means on said blade support.

10. A lawn and gardening tool as set forth in claim 1 wherein said means for supporting said blade comprises an elongated tubular member having a length of at least 2.5 feet with said blade at one end and a handle at the other.

11. A lawn and gardening tool as set forth in claim 1 wherein said means for actuating said clamp comprises an elongated lever extending parallel to said tubular member with said clamp operatively engaged to said lever at one end thereof and means at the other for pivotal movement of said lever about a pivot intermediate the ends of said lever and spring means.

12. A lawn and gardening tool for removing weeds comprising:
    an elongated blade with a cutting edge at one end for penetrating the soil and cutting a weed below the soil surface;
    a clamp positioned adjacent said blade and adapted for movement to and from a clamping position in which a weed is clamped between the clamp and blade, said clamp having an upper portion bent to form a lever at an acute angle to said clamp;
    means forming a pivot for said lever and said clamp;
    spring means for normally tensioning said clamp against said blade;
    an elongated member supporting said clamp and blade at one end and having a handle at the other end;
    an activating member slideably attached to said elongated member, the lower end of said activating member positioned against said lever of said clamp, and the upper end of said activating member adjacent to at least a portion of said handle; and
    means for moving said activating member in a downward direction against said lever in order to move said clamp.

* * * * *